(12) United States Patent
Wang et al.

(10) Patent No.: US 12,335,776 B2
(45) Date of Patent: *Jun. 17, 2025

(54) OUT-OF-ORDER PACKET HANDLING IN 5G/NEW RADIO

(71) Applicant: Verizon Patent and Licensing Inc., Basking Ridge, NJ (US)

(72) Inventors: Xin Wang, Morris Plains, NJ (US); Hui Zhao, Marlboro, NJ (US); Lily Zhu, Parsippany, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

This patent is subject to a terminal disclaimer.

(21) Appl. No.: 18/064,474

(22) Filed: Dec. 12, 2022

(65) Prior Publication Data

US 2023/0110709 A1   Apr. 13, 2023

Related U.S. Application Data

(63) Continuation of application No. 17/247,747, filed on Dec. 22, 2020, now Pat. No. 11,546,796, which is a continuation of application No. 15/907,174, filed on Feb. 27, 2018, now Pat. No. 10,893,437.

(51) Int. Cl.
| | | |
|---|---|---|
| H04W 28/02 | (2009.01) | |
| H04L 47/10 | (2022.01) | |
| H04L 47/28 | (2022.01) | |
| H04L 47/30 | (2022.01) | |
| H04L 47/62 | (2022.01) | |
| H04W 28/04 | (2009.01) | |
| H04W 76/16 | (2018.01) | |
| H04L 47/193 | (2022.01) | |
| H04W 88/06 | (2009.01) | |

(52) U.S. Cl.
CPC ........... *H04W 28/04* (2013.01); *H04L 47/28* (2013.01); *H04L 47/30* (2013.01); *H04L 47/624* (2013.01); *H04W 28/0205* (2013.01); *H04W 76/16* (2018.02); *H04L 47/193* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,349,398 B1 | 3/2008 | Favor et al. | |
| 8,997,137 B2 * | 3/2015 | Mathews | H04N 21/6587 725/87 |
| 9,054,869 B2 | 6/2015 | Pirskanen et al. | |
| 9,288,015 B2 | 3/2016 | Peisa | |
| 9,722,763 B2 * | 8/2017 | Lida | H04L 5/143 |
| 10,033,658 B2 | 7/2018 | Bouazizi et al. | |
| 10,165,531 B1 | 12/2018 | Behera | |

(Continued)

*Primary Examiner* — Duc T Duong

(57) ABSTRACT

A user equipment (UE) can receive a first data stream and a second data stream; store data units of the second data stream, as stored data units, in a buffer while a retransmission operation is performed for the first data stream; determine that a threshold is satisfied with regard to the buffer, wherein the threshold is associated with a counter that is maintained based on the storing of the data units; and provide the stored data units based on determining that the threshold is satisfied.

20 Claims, 5 Drawing Sheets

200 →

(56) References Cited

U.S. PATENT DOCUMENTS

| | | |
|---|---|---|
| 10,523,589 B2 | 12/2019 | Wang |
| 10,938,516 B1* | 3/2021 | Wu .................. H04L 45/66 |
| 2004/0071086 A1 | 4/2004 | Haumont et al. |
| 2005/0254488 A1 | 11/2005 | Huang |
| 2007/0223372 A1 | 9/2007 | Haalen et al. |
| 2008/0112406 A1 | 5/2008 | Ding et al. |
| 2008/0209297 A1 | 8/2008 | Chandra et al. |
| 2009/0040929 A1 | 2/2009 | Lee et al. |
| 2009/0052397 A1* | 2/2009 | Meylan ............ H04L 47/34 |
| | | 370/331 |
| 2010/0180033 A1 | 7/2010 | Abdelal et al. |
| 2010/0329141 A1 | 12/2010 | Apostol et al. |
| 2010/0332698 A1 | 12/2010 | Muller |
| 2011/0243139 A1 | 10/2011 | Nishimura |
| 2013/0132603 A1* | 5/2013 | Cohen ............... H04L 69/164 |
| | | 709/231 |
| 2013/0170444 A1 | 7/2013 | Pani et al. |
| 2014/0088911 A1* | 3/2014 | Rabinovich ........ G01R 31/2851 |
| | | 702/117 |
| 2014/0269684 A1 | 9/2014 | Fortune et al. |
| 2014/0376459 A1 | 12/2014 | Kanamarlapudi et al. |
| 2015/0105121 A1* | 4/2015 | Emmanuel ......... H04W 74/002 |
| | | 455/553.1 |
| 2015/0117357 A1 | 4/2015 | Ozturk et al. |
| 2016/0036564 A1* | 2/2016 | Krishnan ............ H04L 1/0045 |
| | | 714/748 |
| 2016/0182369 A1 | 6/2016 | Vasudevan et al. |
| 2016/0241484 A1 | 8/2016 | De Schepper et al. |
| 2017/0041767 A1 | 2/2017 | Vajapeyam et al. |
| 2017/0064707 A1 | 3/2017 | Xiao et al. |
| 2017/0078209 A1 | 3/2017 | Miklos |
| 2017/0118793 A1 | 4/2017 | Liu et al. |
| 2017/0222943 A1 | 8/2017 | Yao et al. |
| 2017/0245252 A1 | 8/2017 | Gao et al. |
| 2017/0264562 A1 | 9/2017 | Yi et al. |
| 2018/0070126 A1 | 3/2018 | Martel et al. |
| 2018/0097738 A1 | 4/2018 | Torres et al. |
| 2018/0167436 A1 | 6/2018 | Han et al. |
| 2018/0234359 A1 | 8/2018 | Hosseini et al. |
| 2018/0279169 A1 | 9/2018 | Wang et al. |
| 2018/0352471 A1* | 12/2018 | Benammar ........... H04L 1/1887 |
| 2019/0044880 A1 | 2/2019 | Yi et al. |
| 2019/0104560 A1 | 4/2019 | Nuggehalli |
| 2019/0215107 A1* | 7/2019 | Lida .................. H04L 1/0007 |
| 2020/0084661 A1 | 3/2020 | Hannu et al. |
| 2020/0100324 A1 | 3/2020 | Wittberg et al. |
| 2020/0236043 A1 | 7/2020 | Sze et al. |
| 2021/0297915 A1 | 9/2021 | Decarreau et al. |

* cited by examiner

OUT-OF-ORDER PACKET HANDLING IN 5G/NEW RADIO

RELATED APPLICATION

This application is a continuation of U.S. patent application Ser. No. 17/247,747, entitled "OUT-OF-ORDER PACKET HANDLING IN 5G/NEW RADIO," filed Dec. 22, 2020, which is a continuation of U.S. patent application Ser. No. 15/907,174, entitled "OUT-OF-ORDER PACKET HANDLING IN 5G/NEW RADIO," filed Feb. 27, 2018 (now U.S. Pat. No. 10,893,437), both of which are incorporated herein by reference.

BACKGROUND

5G/New Radio (5G/NR) provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like. User equipment (UEs) during the transition between 4G/Long Term Evolution (4G/LTE) and 5G/NR can support the simultaneous use of 4G/LTE and 5G/NR.

DETAILED DESCRIPTION OF PREFERRED EMBODIMENTS

Figure 1A:
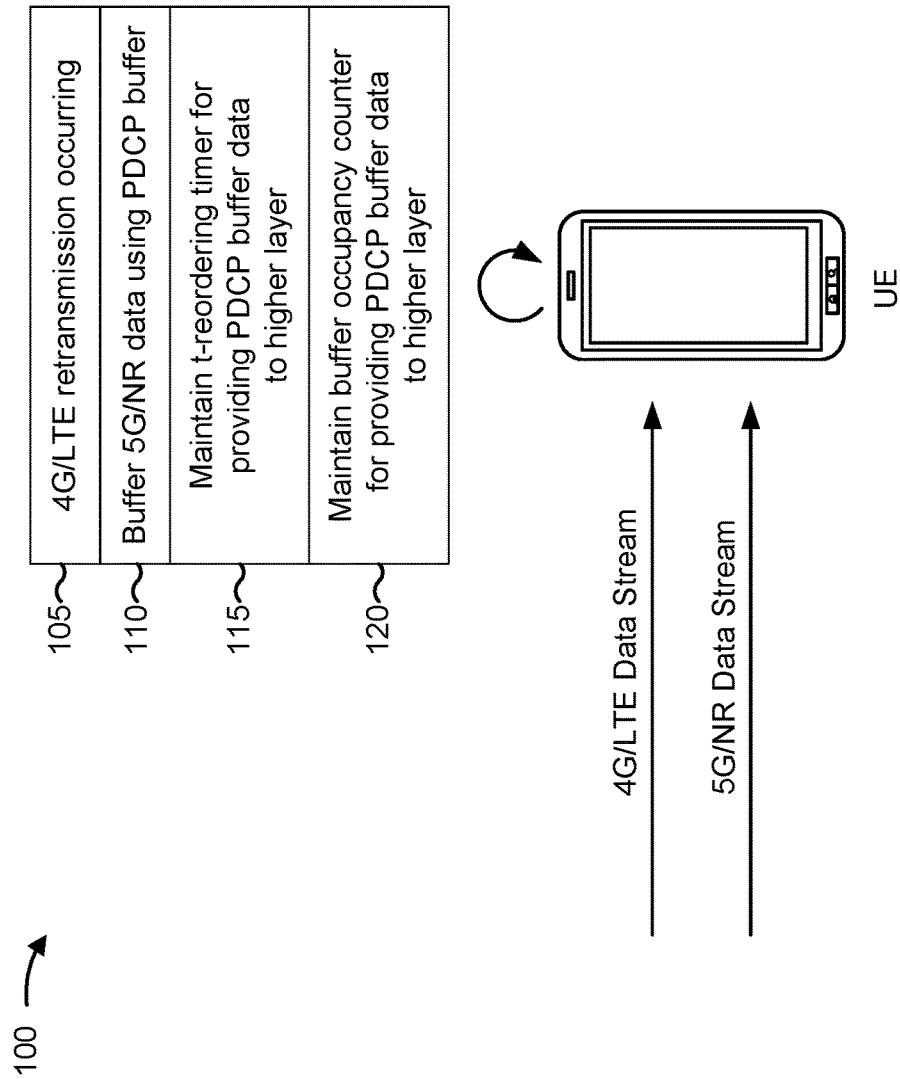
FIGS. 1A and 1B are diagrams of an overview of an example implementation described herein.

The following detailed description of example implementations refers to the accompanying drawings. The same reference numbers in different drawings can identify the same or similar elements.

A UE can provide dual connectivity with regard to two or more radio access technologies (RATs). One dual connectivity configuration is E-UTRAN-NR dual connectivity (EN-DC), which can provide dual connectivity between an Evolved Universal Mobile Telecommunications System (UMTS) Terrestrial Radio Access network (E-UTRAN), such as 4G/LTE, and a NR network, such as 5G/NR. For example, the 4G/LTE network can provide a fallback option when 5G/NR coverage is not adequate or when some services (e.g., Voice over Internet Protocol (VoIP), such as Voice over LTE (VoLTE), and/or other services) are not deployed on the 5G/NR network.

For a UE performing EN-DC, data can be received on both a 4G/LTE connection and a 5G/NR leg (e.g., on a secondary cell group split bearer). Since data speed and latency are significantly different for 4G/LTE and 5G/NR, this creates some challenges for EN-DC UEs. For example, in scenarios where the 4G/LTE connection experiences bad radio frequency conditions and performs hybrid automatic repeat request (HARQ) and/or radio link control (RLC) retransmissions, the 5G/NR connection can continue to receive data at a higher rate than the 4G/LTE connection. This can cause a large number of out-of-order packets at the UE.

A 5G/NR packet data convergence protocol (PDCP) layer can provide reordering functionality, and can increase sequence number length to 18 bits (e.g., compared to 12 bits in the 4G/LTE PDCP). While this helps to reorder data packets, it also means that large reorder buffers can be needed at the UE. In the extreme cases, this could require 1.17 gigabytes of PDCP buffer for each radio bearer. Guaranteeing such large memory spaces in the modem is impractical. As a result, EN-DC UEs can experience buffer congestion and buffer overflow at the PDCP layer, impacting upper layer performance and leading to poor user perception (e.g. based on transport control protocol (TCP) timeout and data stall).

A reordering timer, which can be referred to as the t-reordering timer, has been implemented at the 5G/NR PDCP layer. When the t-reordering timer expires, the UE can deliver data in the PDCP buffer to an upper layer of the UE. The t-reordering timer can be configured based on a value large enough to accommodate HARQ retransmission and RLC retransmission delays, to maintain sufficiently low packet loss rate. For 4G/LTE, this value can be on the order of hundreds of milliseconds. In the case that data is flowing at a high speed on the 5G/NR connection at the same time, the PDCP buffer could become congested or full before the t-reordering timer triggers provision of the buffered data to the upper layer. When the PDCP reordering buffer is full, subsequent packets received from lower layers can be dropped. This can be particularly problematic when high-speed traffic, such as 5G/NR traffic, is dropped, as a significant amount of data can be lost.

Some implementations described herein can trigger provision of buffered data to the upper layer based on a buffer occupancy counter that is based on a number of packets (e.g., data units, etc.) that are buffered by the UE. When the buffer occupancy counter satisfies a threshold, the UE can provide the buffered packets to the upper layer. The buffer occupancy counter can be implemented in addition to or as an alternative to the t-reordering timer. For example, the buffer occupancy counter can cause the content of the PDCP buffer to be provided to the upper layer more frequently than the t-reordering timer. In some implementations, the threshold can be based on a buffer size, a throughput of the UE, a desired user experience, and/or the like. In this way, the buffer occupancy counter can reduce dropped traffic associated with a higher throughput connection, such as a 5G/NR connection. Furthermore, the buffer occupancy counter can decrease a required size of the PDCP buffer, thereby conserving memory resources of the UE. Still further, the buffer occupancy counter can improve user experience with regard to buffered traffic (e.g., by preventing or reducing TCP timeout, data loss, and/or the like).

Figure 1B:
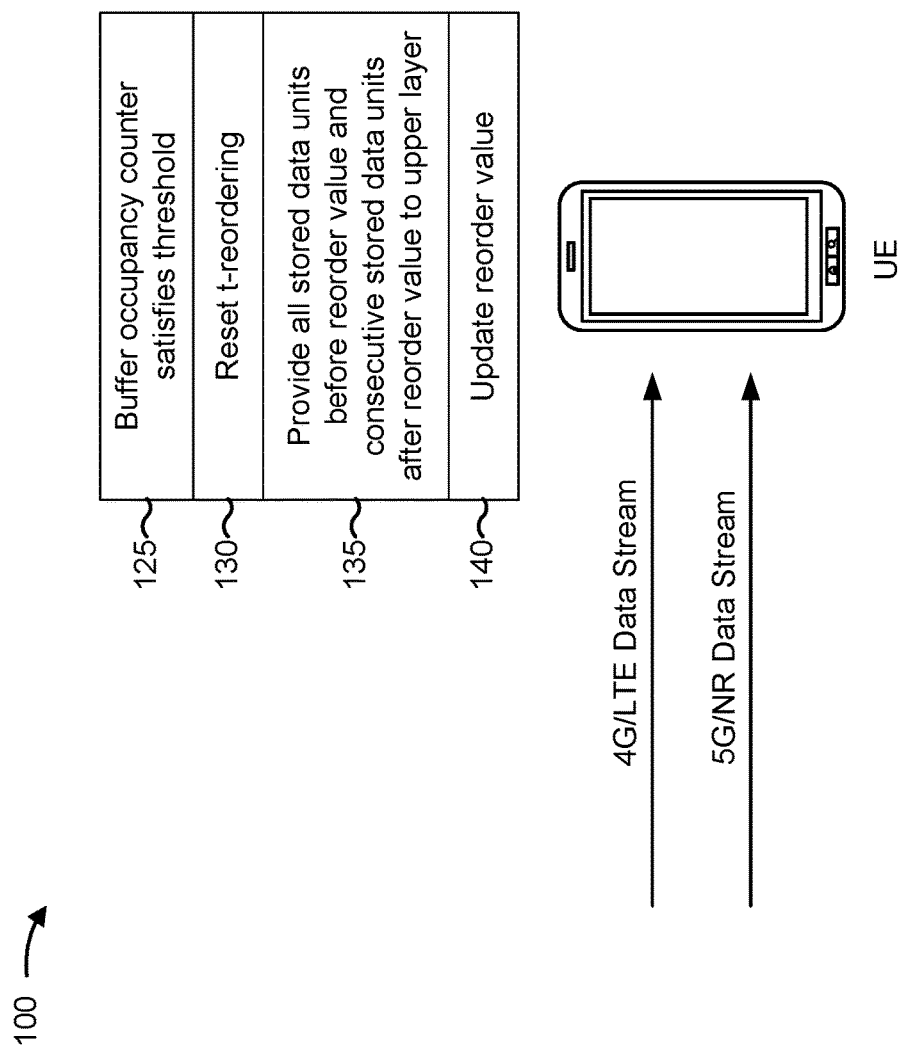

FIGS. 1A and 1B are diagrams of an overview of an example implementation 100 described herein. As shown, FIGS. 1A and 1B include a UE. The UE can be capable of performing dual connectivity, such as EN-DC for a 4G/LTE connection and a 5G/NR connection. However, the techniques and apparatuses described herein are not limited to those involving EN-DC for a 4G/LTE connection and a 5G/NR connection. For example, the techniques and apparatuses described herein can be performed for any pair of data streams associated with different radio access technologies. As shown, the UE can receive a 4G/LTE data stream (e.g., via the 4G/LTE connection) and a 5G/NR data stream (e.g., via the 5G/NR connection).

As shown by reference number 105, the UE can determine that a 4G/LTE retransmission is occurring or is to occur. For example, the 4G/LTE retransmission can include a HARQ retransmission, an RLC retransmission, or a different type of retransmission. As shown by reference number 110, the UE can buffer the 5G/NR data stream using a PDCP buffer based on determining that the 4G/LTE retransmission is occurring or is to occur. For example, the UE can buffer the 5G/NR data stream so that the UE can subsequently reorder the 4G/LTE retransmission and the 5G/NR data stream. In some implementations, the PDCP buffer can be maintained by a PDCP entity associated with the 5G/NR connection.

As shown by reference number 115, the UE can maintain a timer for providing the data of the PDCP buffer (e.g., data of the 5G/NR data stream) to an upper layer of the UE, such as any layer above the PDCP layer of the UE. For example, the timer can include the t-reordering timer defined in 3GPP Technical Specification (TS) 38.323. When the timer expires, the PDCP entity can provide a content of the PDCP buffer to the upper layer of the UE. In some implementations, the timer can be configured with a value so that the retransmission operation can be performed before the timer expires. This can be to reduce dropped traffic associated with the retransmission operation. However, in the case of a high-throughput connection such as the 5G/NR connection, the PDCP buffer can store significant amounts of data in the time required for the retransmission operation. This can require a large buffer and impact user experience with regard to the 5G/NR connection.

As shown by reference number 120, the UE can maintain a counter for providing the PDCP buffer data (e.g., associated with the 5G/NR data stream) to the upper layer of the UE. Here, the counter is referred to as a buffer occupancy counter. Here, the UE maintains the timer and the counter, which allows for periodic clearing of the buffer when a data rate of the 5G/NR connection is too low to trigger a threshold associated with the counter. In some implementations, the UE can maintain only the counter, which can conserve processor resources that would otherwise be used to maintain the timer.

In some implementations, the UE can keep a counter for each PDCP entity of the UE. In some implementations, the UE can initialize or re-initialize the counter when the PDCP entity is established or re-established. The UE can increment the counter by the number of bytes in the PDCP service data units (SDUs) that are received from a lower layer (e.g., any layer below the PDCP layer). The UE can decrement the counter by the number of bytes in the PDCP SDUs that are delivered to the upper layer.

As shown in FIG. 1B, and by reference number 125, the UE can determine that the counter (e.g., the buffer occupancy counter) satisfies a threshold. For example, the threshold associated with the buffer occupancy counter can be configured so that buffered data is provided to the upper layer before the buffer is full and/or before user experience for the 5G/NR connection is impacted. In some implementations, the buffer occupancy counter can be configured based on a throughput of the UE, based on user experience associated with the 5G/NR connection, and/or the like.

As shown by reference number 130, the UE can stop and/or reset the timer (e.g., the t-reordering timer) based on determining that the counter satisfies the threshold. As shown by reference number 135, the UE can provide all stored data units that are before a reorder value, and can provide consecutive stored data units after the reorder value, to the upper layer. For example, data units (e.g., SDUs, etc.) of the PDCP buffer can be associated with identifiers, such as COUNT values, sequence numbers, and/or the like. The reorder value can identify a COUNT value of a data unit following the COUNT value associated with the PDCP data packet data unit (PDU) that triggered the timer. For example, the reorder value can be RX_REORD defined in 3GPP TS 38.323. In some implementations, the UE can provide the data units in ascending order of the COUNT values associated with the data units. In some implementations, the UE can provide the data units after performing header decompression for the data units.

In some implementations, the UE does not provide all stored data units. For example, the UE does not provide a data unit that is not associated with a consecutive COUNT value after the reorder value. This can conserve processor resources and can permit the UE to wait for a data unit corresponding to the gap between the data unit and data units associated with consecutive COUNT values.

In some implementations, the UE can update a delivery value for the buffered data units. The delivery value can identify a COUNT value of the first data unit, not provided to the upper layers, that has yet to be received. For example, the delivery value can be RX_DELIV defined in 3GPP TS 38.323. The UE can update the delivery value to a COUNT value of the first data unit that was not delivered to the upper layer. For example, the COUNT value for the delivery value can be greater than or equal to the reorder value.

As shown by reference number 140, the UE can update the reorder value. For example, the UE can update the reorder value to a next expected data unit value. For example, the next expected data unit value can identify a next data unit that is expected to be received. In some implementations, the next expected data unit value can be RX_NEXT defined in 3GPP TS 38.323. In some implementations, when the reorder value is lower than the next expected data unit value (e.g., when the COUNT value of the data unit that triggered the timer is lower than a next expected data unit), the UE can update the reorder value to the next expected data unit value, and can start the reorder timer based on the next expected data unit value. Thus, the UE can restart the timer based on providing the content of the PDCP buffer to the upper layer, and can update delivery values and next expected data unit values based on providing the content of the PDCP buffer.

In this way, TCP congestion is reduced. Furthermore, the counter-triggered out-of-order delivery allows TCP congestion to be dealt with from a holistic and end-to-end perspective. Still further, required buffer size at the UE is reduced. Even further, a likelihood of dropped data is reduced, particularly for high-throughput data streams.

In some implementations, this procedure can be applied for any radio bearer. While high-speed data radio bearers (DRBs), such as an Internet bearer, can see more frequent triggering of buffer provision based on the counter, signaling radio bearers (SRBs) might not experience the out-of-order issue as frequently. The threshold can be set differently for different type of bearers or type of devices. For example, when a standalone (SA) device (e.g., UE) is available, the configuration for the threshold can be different compared with a secondary cell group (SCG) split bearer for non-standalone (NSA) Option 3x devices, as defined in 3GPP TS 38.801. In some implementations, the counter-based triggering of buffer content provision can be effectively disabled by configuring the threshold as "infinity" or a very high value.

As indicated above, FIG. 1 is provided merely as an example. Other examples are possible and can differ from what was described with regard to FIG. 1.

Figure 2:
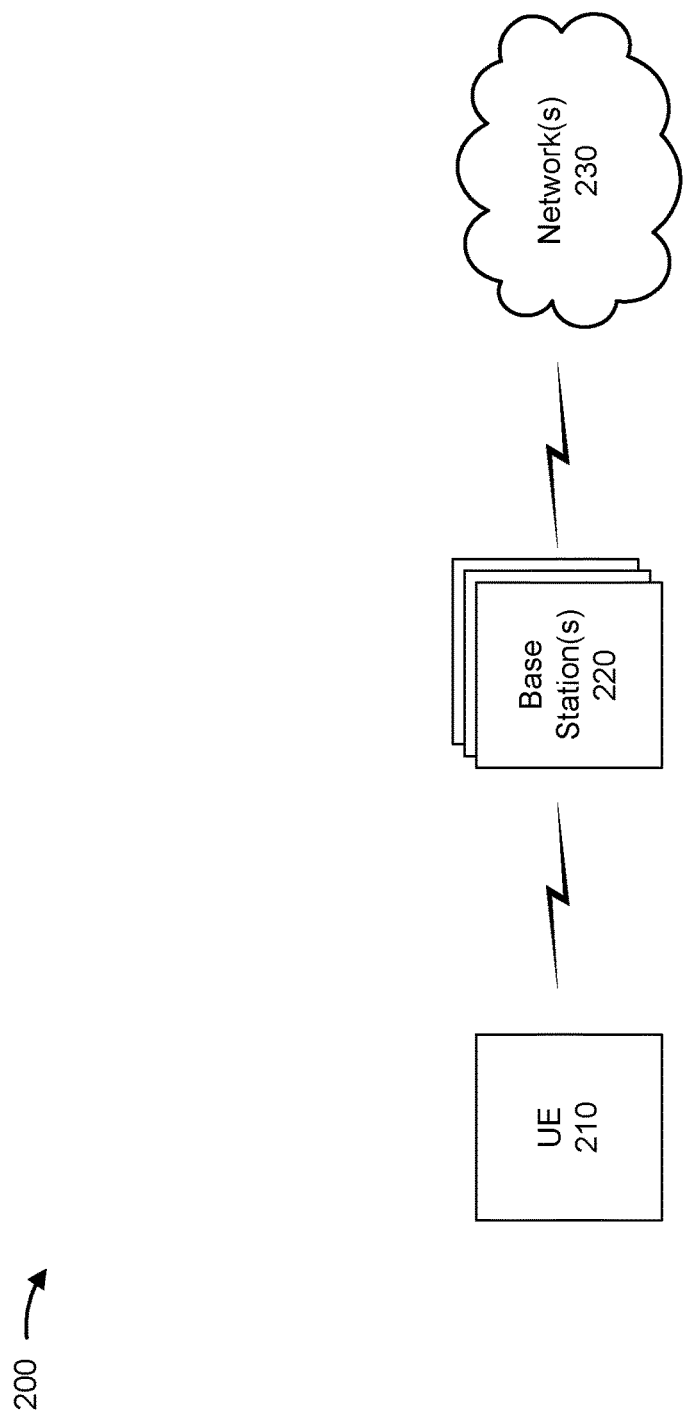
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a UE 210, one or more base stations 220, and one or more networks 230. Devices of environment 200 can interconnect via wired connections, wireless connections, or a combination of wired and wireless connections.

UE 210 includes one or more devices capable of communicating with base station 220 and/or a network (e.g., network 230). For example, UE 210 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, a mobile hotspot device, a fixed wireless access device, and/or a similar device. UE 210 can be capable of communicating using uplink (e.g., UE to base station) communications, downlink (e.g., base station to UE) communications, and/or sidelink (e.g., UE-to-UE) communications. In some implementations, UE 210 can include a machine-type communication (MTC) UE, such as an evolved or enhanced MTC (eMTC) UE. In some implementations, UE 210 can include an Internet of Things (IoT) UE, such as a narrowband IoT (NB-IoT) UE and/or the like. In some implementations, UE 210 can be capable of communicating using multiple RATs, as described in more detail in connection with FIG. 5, below.

Base station 220 includes one or more devices capable of communicating with UE 210 using a cellular RAT. For example, base station 220 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 220 can transfer traffic between UE 210 (e.g., using a cellular RAT), other base stations 220 (e.g., using a wireless interface or a backhaul interface, such as a wired backhaul interface), and/or network 230. Base station 220 can provide one or more cells that cover geographic areas. Some base stations 220 can be mobile base stations. Some base stations 220 can be capable of communicating using multiple RATs.

In some implementations, base station 220 can perform scheduling and/or resource management for UEs 210 covered by base station 220 (e.g., UEs 210 covered by a cell provided by base station 220). In some implementations, base stations 220 can be controlled or coordinated by a network controller, which can perform load balancing, network-level configuration, and/or the like. The network controller can communicate with base stations 220 via a wireless or wireline backhaul. In some implementations, base station 220 can include a network controller, a self-organizing network (SON) module or component, or a similar module or component. In other words, a base station 220 can perform network control, scheduling, and/or network management functions (e.g., for other base stations 220 and/or for uplink, downlink, and/or sidelink communications of UEs 210 covered by the base station 220). In some implementations, base station 220 can include a central unit and multiple distributed units. The central unit can coordinate access control and communication with regard to the multiple distributed units. The multiple distributed units can provide UEs 210 and/or other base stations 220 with access to network 230.

Network 230 includes one or more wired and/or wireless networks. For example, network 230 can include a cellular network (e.g., a code division multiple access (CDMA) network, a 3G network, a 4G/LTE network, a 5G/NR network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
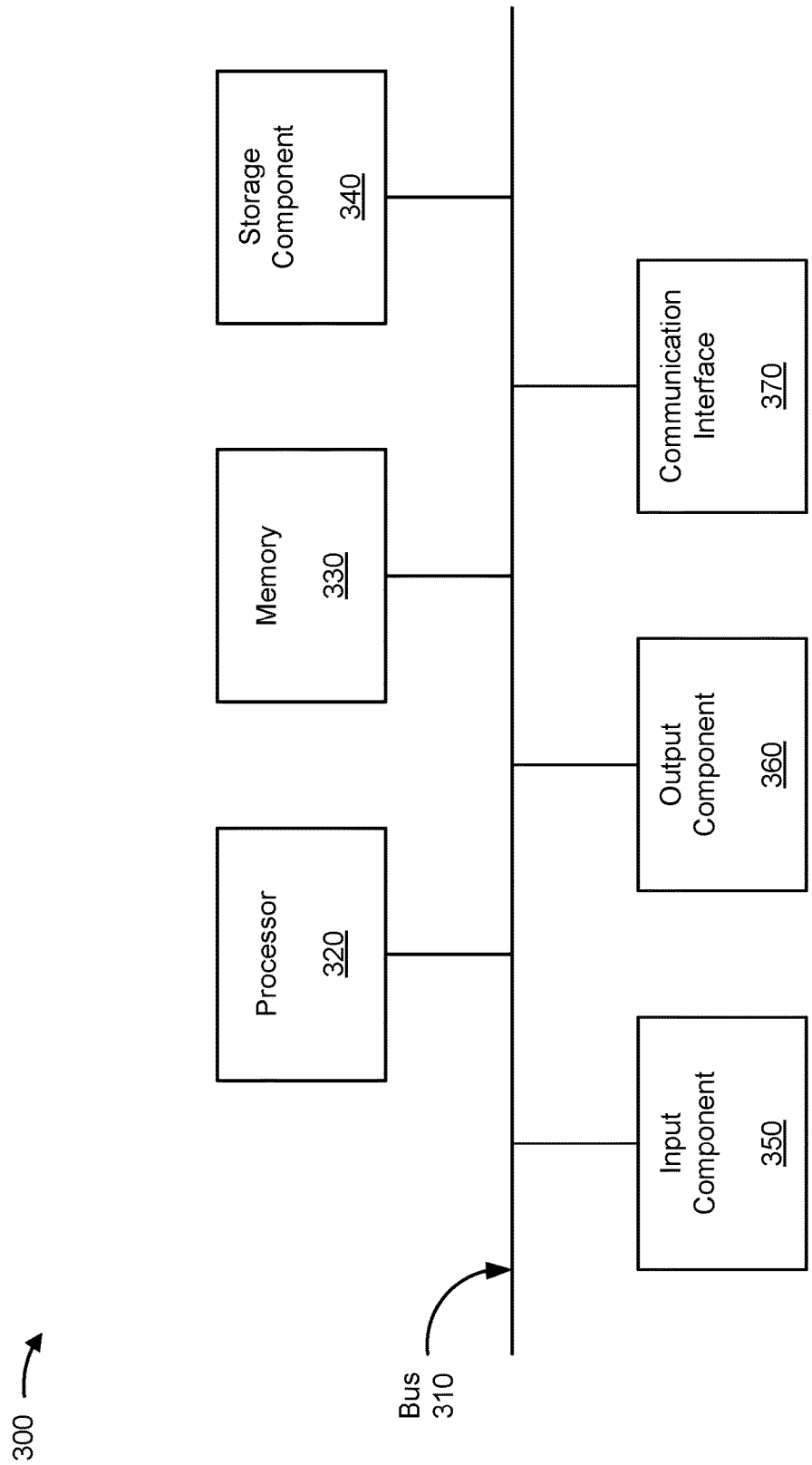
FIG. 3 is a diagram of example components of one or more devices of FIG. 2.

FIG. 3 is a diagram of example components of a device 300. Device 300 can correspond to UE 210 or base station 220. In some implementations, UE 210 and/or base station 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
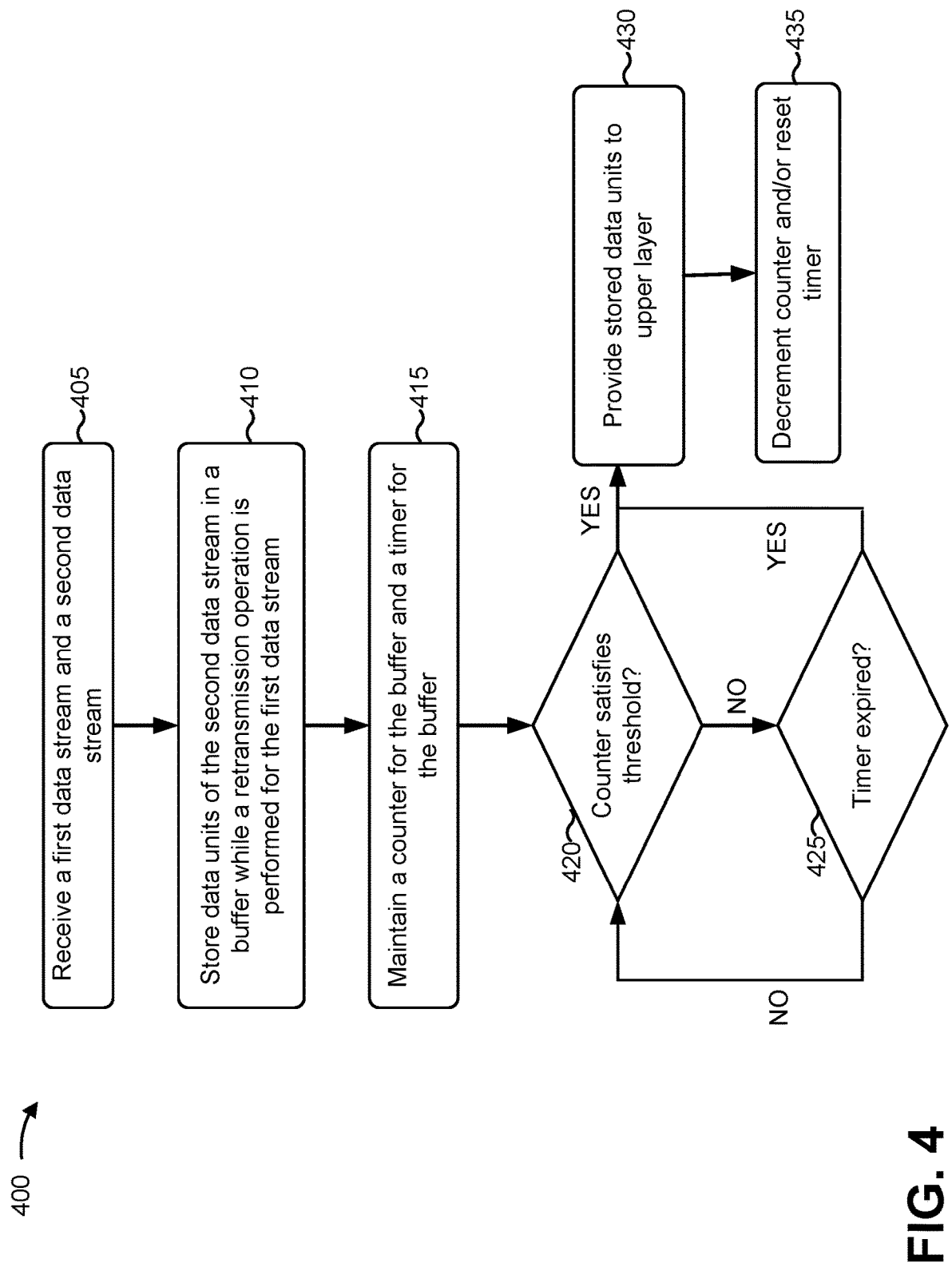
FIG. 4 is a flow chart of an example process for managing a packet data convergence protocol buffer based on a counter and a timer.

FIG. 4 is a flow chart of an example process 400 for managing a PDCP buffer based on a counter and a timer. In some implementations, one or more process blocks of FIG. 4 can be performed by UE 210. In some implementations, one or more process blocks of FIG. 4 can be performed by another device or a group of devices separate from or including UE 210, such as base station 220.

As shown in FIG. 4, process 400 can include receiving a first data stream and a second data stream (block 405). For example, UE 210 (e.g., using input component 350, communication interface 370, and/or the like) can receive a first data stream and a second data stream. In some implementations, the first data stream can be associated with different connections or different bearers. For example, the first data stream can be associated with a 4G/LTE bearer or connection and the second data stream can be associated with a 5G/NR bearer or connection, as described in more detail elsewhere herein.

As further shown in FIG. 4, process 400 can include storing data units of the second data stream in a buffer while a retransmission operation is performed for the first data stream (block 410). For example, UE 210 (e.g., using a PDCP entity, storage component 340, and/or the like) can store data units of the second data stream in a buffer. UE 210 can be associated with a PDCP entity that stores the data units of the second data stream in the buffer. For example, the buffer can include a PDCP buffer and/or the like. In some implementations, UE 210 can store the data units of the second data stream in the buffer while a retransmission operation is performed for the first data stream. In a case wherein the second data stream is associated with a sufficiently high throughput, this can cause significant buffer space to be used while UE 210 waits for the retransmission operation to be completed for the first data stream.

As further shown in FIG. 4, process 400 can include maintaining a counter for the buffer and a timer for the buffer (block 415). For example, UE 210 (e.g., using a PDCP entity, processor 320, and/or the like) can maintain a counter for the buffer and a timer for the buffer. The counter can be the buffer occupancy counter described in more detail elsewhere herein. The timer can be the t-reordering timer described in more detail elsewhere herein. The counter can be associated with a threshold for providing content of the buffer (e.g., the stored data units) to an upper layer of UE 210, which reduces a likelihood of dropped data, oversized buffers, TCP timeout, and/or other issues associated with providing content of the buffer only based on the timer.

As further shown in FIG. 4, process 400 can include determining whether the counter satisfies a threshold (block 420). For example, UE 210 (e.g., using a PDCP entity, processor 320, and/or the like) can determine whether the counter satisfies a threshold. As further shown in FIG. 4, when the counter does not satisfy the threshold (block 420—NO), then process 400 can include determining whether the timer is expired (block 425). For example, when UE 210 determines that the counter does not satisfy the threshold (e.g., when the content of the buffer is not to be provided to the upper layer based on the threshold), then UE 210 (e.g., using a PDCP entity, processor 320, and/or the like) can determine whether the timer is expired.

As further shown in FIG. 4, when the counter satisfies the threshold (block 420—YES), or when the timer has expired (block 425—YES), then process 400 can include providing stored data units to an upper layer (block 430). For example, UE 210 (e.g., using a PDCP entity, processor 320, and/or the like) can provide stored data units to the upper layer when the timer is expired or when the counter satisfies the threshold. As further shown in FIG. 4, process 400 can include decrementing the counter and/or resetting the timer (block 435). For example, UE 210 (e.g., using a PDCP entity, processor 320, and/or the like) can decrement the counter (e.g., based on providing the content of the buffer to the upper layer) and/or reset the timer. In some implementations, UE 210 can perform the procedure described in connection with FIG. 1B when UE 210 determines that the counter satisfies the threshold or that the timer has expired. In some implementations, UE 210 can perform the procedure described in Section 5.2.2.2 of 3GPP TS 38.323 when UE 210 determines that the counter satisfies the threshold or that the timer has expired. By performing the same procedure irrespective of determining that the threshold is satisfied or the timer has expired, UE 210 conserves processor and configuration resources that would otherwise be used to define and perform a different procedure when the threshold is satisfied than when the timer has expired.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, UE 210 can reduce dropped traffic associated with a high-throughput connection, such as a 5G/NR connection. Furthermore, UE 210 can decrease a required size of the PDCP buffer, thereby conserving memory resources of UE 210. Still further, the buffer occupancy counter can improve user experience with regard to buffered traffic (e.g., by preventing or reducing TCP timeout, data loss, and/or the like).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user equipment (UE) for wireless communication, comprising:
    one or more processors coupled to memory, the one or more processors configured to:
        store second data units of a second data stream in a buffer while a retransmission operation is performed for first data units of a first data stream;
        provide the second data units to an upper layer of the UE based on determining that a threshold is satisfied with regard to the buffer; and
        update a reorder value for the second data units, wherein the reorder value is a next expected data unit value for the second data units.

2. The UE of claim 1, wherein the one or more processors, to provide the second data units before the reorder value to the upper layer of the UE based on determining that the threshold is satisfied with regard to the buffer, are configured to:
    provide the second data units before the reorder value to the upper layer of the UE and consecutive stored data after the reorder value based on determining that the threshold is satisfied with regard to the buffer.

3. The UE of claim 1, wherein the one or more processors, to update the reorder value for the second data units, are configured to:
    update the reorder value for the second data units to a next expected data unit value for the second data units; and
    wherein the one or more processors are to further configured to:
        start a reorder timer based on the next expected data unit value.

4. The UE of claim 1, wherein a throughput connection of the second data stream is greater than a throughput connection of the first data stream.

5. The UE of claim 1, wherein the second data units are stored for reordering of the second data units in the buffer with regard to the first data units of the first data stream.

6. The UE of claim 1, wherein the one or more processors are further configured to:
    maintain a timer associated with the buffer; and
    wherein, to provide the second data units to the upper layer, the one or more processors are configured to:
        provide the second data units when the timer expires or when the threshold is satisfied.

7. The UE of claim 1, wherein the one or more processors are further configured to:
    associate the threshold with a buffer occupancy counter, wherein the buffer occupancy counter is based on a number of the second data units that are buffered by the UE.

8. A non-transitory computer-readable medium storing one or more instructions for wireless communication, the one or more instructions comprising:
    one or more instructions that, when executed by one or more processors of a user equipment (UE), cause the one or more processors to:

store second data units of a second data stream in a buffer while a retransmission operation is performed for first data units of a first data stream;

provide the second data units to an upper layer of the UE based on determining that a threshold is satisfied with regard to the buffer; and update a reorder value for the second data units,
wherein the reorder value is a next expected data unit value for the second data units.

9. The non-transitory computer-readable medium of claim 8, wherein the second data units are stored for reordering of the second data units in the buffer with regard to the first data units of the first data stream.

10. The non-transitory computer-readable medium of claim 8, wherein the one or more instructions, when executed by the one or more processors, further cause the one or more processors to:

maintain a timer associated with the buffer; and
wherein the one or more instructions, that cause the one or more processors to provide the second data units to the upper layer, cause the one or more processors to:
provide the second data units when a reorder timer expires or when the threshold is satisfied.

11. The non-transitory computer-readable medium of claim 8, wherein the first data stream and the second data stream are associated with different radio access technologies.

12. The non-transitory computer-readable medium of claim 8, wherein the one or more instructions, that cause the one or more processors to provide the second data units before the reorder value to the upper layer of the UE, cause the one or more processors to:

provide the second data units before the reorder value to the upper layer of the UE and consecutive stored data after the reorder value based on determining that the threshold is satisfied.

13. The non-transitory computer-readable medium of claim 8, wherein the threshold is based on reducing dropped traffic associated with a throughput connection of the second data stream.

14. The non-transitory computer-readable medium of claim 8, wherein the one or more instructions, when executed by the one or more processors, further cause the one or more processors to:

provide the second data units in ascending order of identifier values associated with the second data units while not providing other stored second data units that are not associated with consecutive identifier values.

15. A method performed by a user equipment (UE), comprising:

storing, by the UE, second data units of a second data stream in a buffer while a retransmission operation is performed for first data units of a first data stream;

providing, by the UE, the second data units to an upper layer of the UE based on determining that a threshold is satisfied with regard to the buffer; and updating, by the UE, a reorder value for the second data units,
wherein the reorder value is a next expected data unit value for the second data units.

16. The method of claim 15, wherein providing the second data units before the reorder value to the upper layer of the UE based on determining that the threshold is satisfied with regard to the buffer comprises:

providing the second data units before the reorder value to the upper layer of the UE and consecutive stored data after the reorder value based on determining that the threshold is satisfied with regard to the buffer.

17. The method of claim 15, wherein a throughput connection of the second data stream is greater than a throughput connection of the first data stream.

18. The method of claim 15, wherein updating the reorder value for the second data units comprises:

updating the reorder value for the second data units to a next expected data unit value for the second data units; and further comprising:
starting a reorder timer based on the next expected data unit value.

19. The method of claim 15, wherein the second data units are stored for reordering of the second data units in the buffer with regard to the first data units of the first data stream.

20. The method of claim 15, wherein the threshold is based on reducing dropped traffic associated with a throughput connection of the second data stream.

* * * * *